Oct. 13, 1970  E. LAKY  3,533,575
INTERMITTENT LEVEL WIND
Filed Nov. 7, 1968  2 Sheets-Sheet 1

INVENTOR.
ELMER LAKY

BY
ATTORNEY

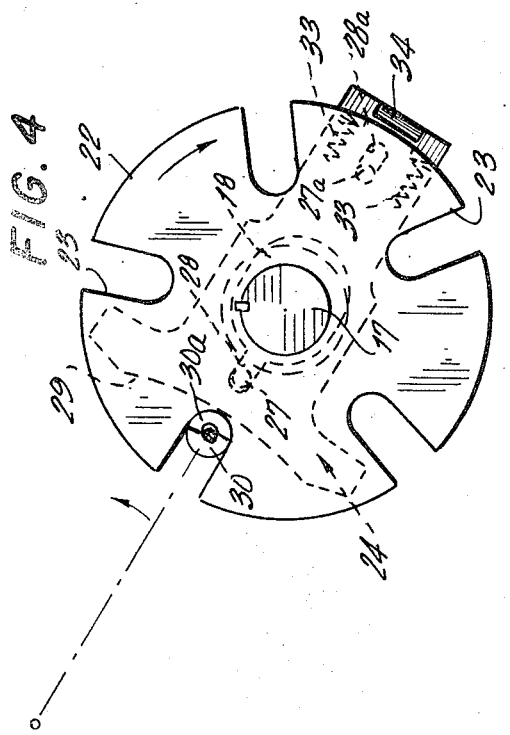
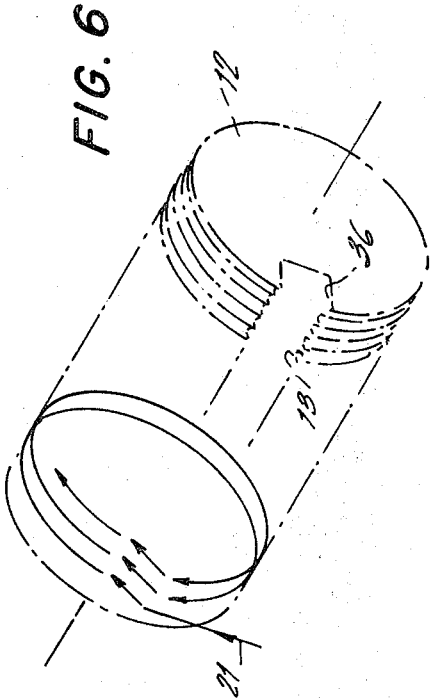
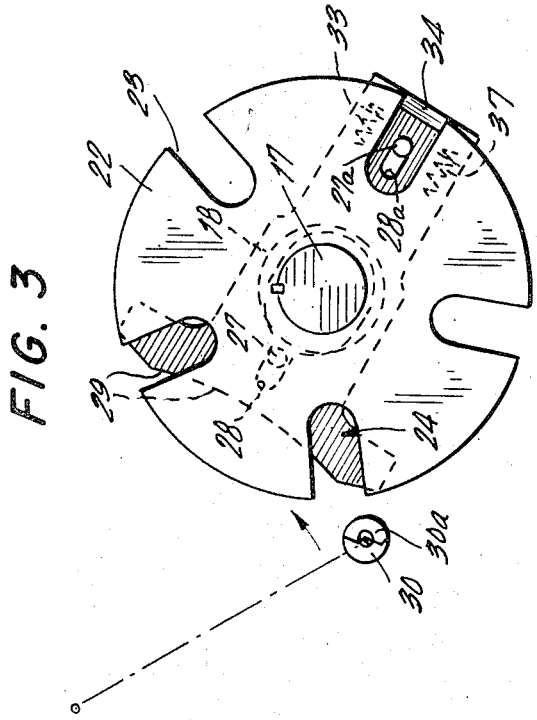
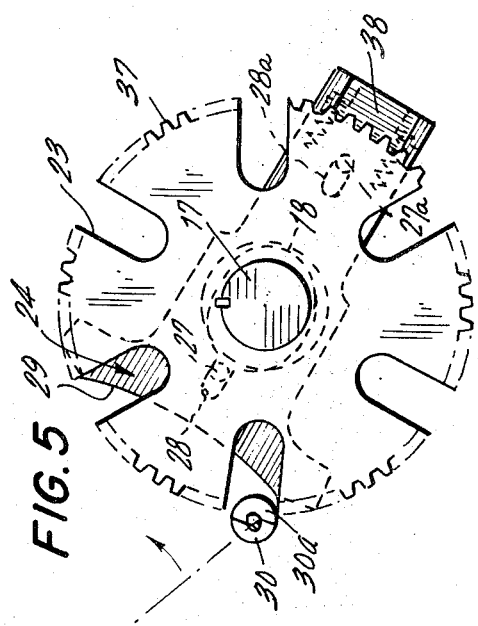

United States Patent Office 3,533,575
Patented Oct. 13, 1970

3,533,575
INTERMITTENT LEVEL WIND
Elmer Laky, Cranford, N.J., assignor to Breeze Corporations, Inc., Union, N.J., a corporation of New Jersey
Filed Nov. 7, 1968, Ser. No. 774,058
Int. Cl. B65h 54/28, 75/18
U.S. Cl. 242—158.3                        5 Claims

ABSTRACT OF THE DISCLOSURE

A level wind device for use with winches or hoists having annularly grooved storage drums in which the cable is intermittently advanced in a lateral direction across the drum to guide it from one groove to another. Between intermittent movements the level wind mechanism is securely locked to prevent accidental movement of the cable and minimize cable wear.

BACKGROUND OF THE INVENTION

It has been found that cables, particularly stranded steel cables, when wrapped upon a helically grooved drum are prone to excessive wear and destruction due to the twisting of the cable as it is placed upon the storage drum. Where cables are crossed over one another additional cable failure results from the compacting and unequal wear. Accordingly, annularly grooved drums have been provided whereon the cable is directed in concentric turns, said cable crossing over between adjacent grooves in a space provided for this purpose. Conventional level wind devices consisting of a continuous worm and a nut traveling thereon are not suited for feeding cables upon annularly grooved drums. Accordingly, the present invention provides an intermittent feed for the cable which is timed to coincide with the space between adjacent grooves in the drum.

SUMMARY OF THE INVENTION

The present invention provides an intermittent level wind assembly in which the cable is directed upon an annularly grooved storage drum and caused to cross over from one groove to another in a space provided for this purpose. The intermittent motion is governed by a Geneva type cam and positive locking means are provided to prevent the cam from moving during such time as the cable is being directed upon the annular groove of the drum.

DESCRIPTION OF THE DRAWINGS

In the accompanying drawings forming a part hereof, corresponding parts have been given identical reference numerals and in which drawings:

FIG. 3 is a fragmentary view in side elevation showing the Geneva cam and locking structure of the present invention, FIG. 4 is a view similar to FIG. 3 showing the Geneva cam in a second position and, FIG. 5 is a view similar to FIGS. 3 and 4 showing the Geneva cam in a third position, FIG. 6 is a somewhat diagramatic view showing the manner in which the cable is directed upon the annular grooves of the drum by the intermittent level wind mechanism of the present invention.

DESCRIPTION OF THE PREFERRED EMBODIMENT

Figure 1:
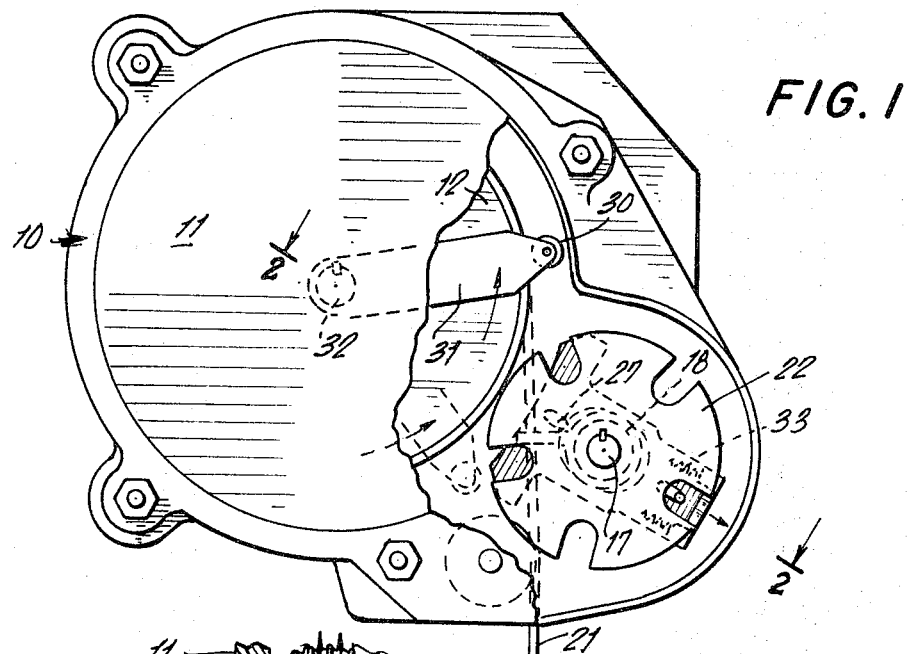
FIG. 1 is a view in side elevation of a winch or hoist partly broken away to show the intermittent level wind assembly forming the present invention.
Figure 2:
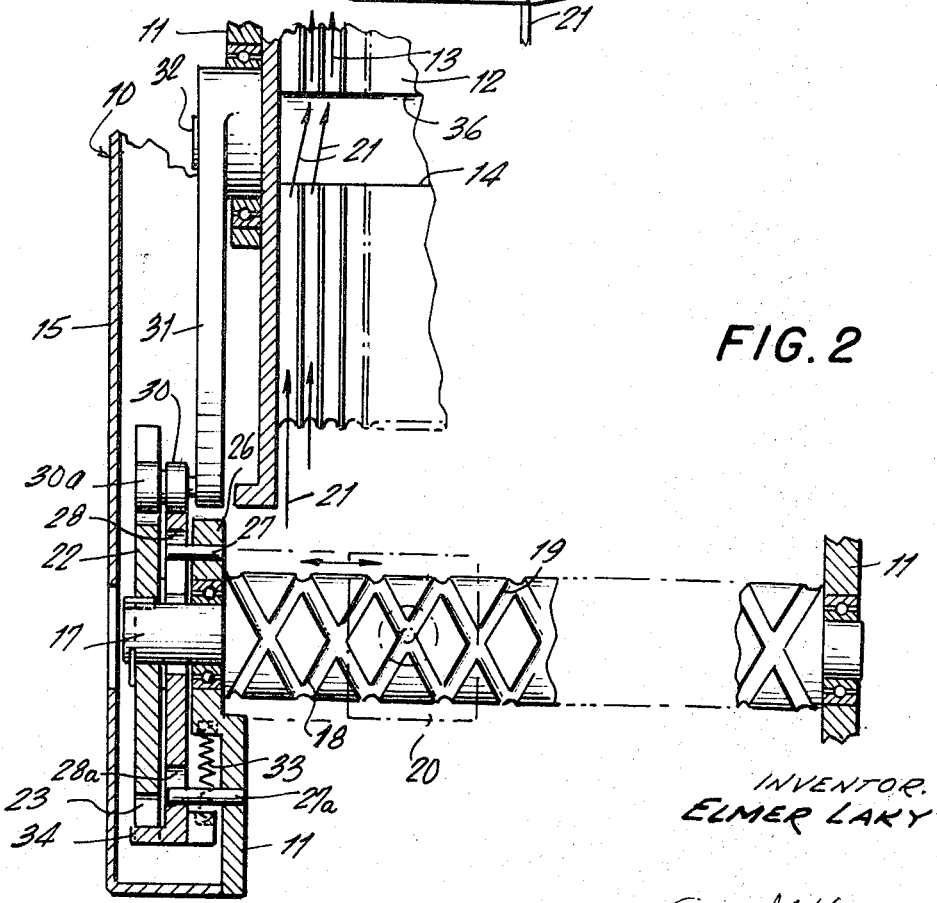
FIG. 2 is a fragmentary view, somewhat enlarged, taken in line 2–2 in FIG. 1 looking in the direction of the arrows.

Referring to the drawings and particularly to FIGS. 1 and 2, 10 indicates a winch or hoist assembly having spaced side frames 11 and a cable storage drum 12 rotatably mounted therebetween. The drum 12 is provided with a series of annular grooves to receive the cable. The drum 12 is also provided with a transverse recess 14 which is cut through the annular grooves as best shown in FIGS. 2 and 6, and provides an air space therebetween.

A housing 15 secured to one of the side frames 11 encloses an intermittent level wind assembly 16. The intermittent level wind assembly 16 is secured to the shaft 17 of the level wind screw 18.

The level wind screw 18 is formed with the customary right and left hand screw configuration 19 which permits a nut 20 to be driven across it in both directions as the cable 21 is fed upon the drum 12. The operation of the level wind screw 18 and nut 20 is well known and forms no part of the present invention.

A cam 22 in the form of a Geneva wheel having a plurality of recessses 23 therein is keyed to the end of the level wind screw shaft 17 as best shown in FIG. 2. Immediately beneath the cam 22 and between the cam and the level wind screw 18 is positioned a locking segment 24 which is carried upon the shaft 17. The locking segment 24 is formed with an enlongated bore 25 so that it may move up and down with respect to the longitudinal axis of the shaft 17.

A bearing member 26 is carried by the frame 11 and supports the shaft 17 therein. The motion of the locking segment 24 is limited by pins 27, 27a carried by the housing frame 11 and extending outwardly thereof into slots 28, 28a in the said locking segment.

As will be observed from FIGS. 3, 4, and 5, the locking segment 24 is somewhat T-shaped and provided with an arcuate bearing surface 29 across the top thereof. The bearing surface 29 is adapted to receive thereon a small roller 30 freely carried upon an arm 31 which in turn is keyed to the main drum shaft 32. The respective arcuate travel of the roller 30 and the size of the radius of the bearing surface 29 is such that as the arm 31 rotates the roller is brought into contact with the bearing surface 29 and depresses it as shown in FIGS. 3 and 4.

When the locking segment 24 is depressed a small coil spring 33 located at the base of the T-shaped segment is tensioned. In addition, a locking detent 34 which is carried at the base of the locking segment 24 and extends outwardly thereof is withdrawn from the recess 35 of the Geneva type cam wheel 22 in which it rested prior to the movement of the locking segment 24 by the roller 30.

As the roller 30 engages the locking segment 24 a second roller 30a enters one of the recesses 25 of the cam 22. Upon the completion of its traverse across the bearing surface 29 of the locking segment 24, the roller 30a will have rotated the cam 22 through an angle equal to the distance between two adjacent recesses 35. At this juncture, the locking segment 24 will be released from the pressure of the roller 30 and the coil spring 33 will move it upwardly thereby permitting the detent 34 to snap into the recess 23 adjacent thereto.

It will be apparent, from the above description, that an intermittent motion is imparted to the level wind screw 18 with each revolution of the drum 12. This intermittent motion is to move the cable 21 laterally a distance equal to the space between adjacent drum grooves 13.

In order to permit the lateral motion of the cable 21 without undue cable wear, the crossover of the cable is carried out in air by means of a transverse cut out portion 36 in the drum 12. This action is clearly shown in the diagrammatic view of FIG. 6 where the arrows indicate the path of the cable 21. The pressure of succeeding lay-ups of cable at the crossover point, which is the point of greatest stress upon the cable, is also decreased by reason of the cut out portion 36.

Referring to FIG. 5 there is shown a further embodiment of the present invention in which the periphery of the cam 22 is provided with gear teeth 37 and a complimentary toothed gear segment 38 is attached to the locking segment 24. The gear segment 38 serves to prevent rotation of the cam 22 and consequently of the level wind screw 18 at all times other than when the cam 22 is being rotated for the purpose of advancing the level wind nut 20.

The operation of the winch 10 is conventional and does not form part of the present invention. Accordingly, further description of the winch, its source of rotary power and gearing arrangements may be dispensed with as well known in the art.

Having thus fully described the invention, what is claimed as new and desired to be secured by Letters Patents of the United States, is:

1. A winch level wind device comprising spaced side frame members, a cable receiving drum rotatably supported between the frame members, cable for said winch, a level wind screw journaled at each end in the frame members and extending across the drum, outwardly extending shafts at each end of the said screw, a level wind nut threaded upon the screw adapted to guide the cable in its travel on and off the drum, a Geneva wheel shaped cam secured to the outer end of one of the screw shafts, said cam having a plurality of equally spaced recesses therein, a somewhat T-shaped locking segment carried by the screw shaft between the cam and the screw and slidable on said shaft in a direction normal to the longitudinal axis of said shaft, an outwardly extending detent on the locking segment receivable within the adjacent cam recess, an arcuate bearing surface on said locking segment, an arm carried by the drum and secured thereto, roller means rotatably secured to the free end of the arm and swingable therewith through an arc which will intersect the circumference of the cam, whereby at each revolution of the drum the roller means will engage one of the recesses and ride upon the arcuate bearing surface of the locking segment to force the detent out of engagement with the cam and rotate the cam through one sector to impart an intermittent motion to the level wind screw and nut.

2. A device according to claim 1 in which the drum is provided with a plurality of annular cable receiving grooves and a transverse recess across said grooves and the level wind nut is moved while the cable is in said recess.

3. A device according to claim 1 in which the locking segment is spring loaded to urge the detent toward the cam at all times.

4. A device according to claim 1 in which the roller means comprises a first roller for engagement with the cam recesses and a second roller for engagement with the arcuate bearing surface on the locking segment.

5. A device according to claim 1 in which the cam is provided with peripheral gear teeth and the outwardly extending detent is in the form of a gear segment engageable with gear teeth.

References Cited
UNITED STATES PATENTS

| | | | |
|---|---|---|---|
| 1,504,004 | 8/1924 | Vienneau | 242—7.15 |
| 1,504,005 | 8/1924 | Vienneau | 242—7.15 X |
| 1,551,251 | 8/1925 | Hopkins | 242—158.3 |
| 1,797,331 | 3/1931 | Dale | 242—158.3 |
| 2,741,441 | 4/1956 | Le Bus | 242—117 |
| 3,272,454 | 9/1966 | Lane et al. | 242—117 |

STANLEY N. GILREATH, Primary Examiner

U.S. Cl. X.R.

242—117